United States Patent [19]

Finkelstein

[11] 3,823,896

[45] July 16, 1974

[54] RECORDING WEB TENSION CONTROL

[75] Inventor: Morris Baer Finkelstein, Bellmawr, N.J.

[73] Assignee: RCA Corporation, New York, N.Y.

[22] Filed: July 30, 1971

[21] Appl. No.: 167,375

[30] Foreign Application Priority Data

Mar. 29, 1971 Great Britain .................... 08113/71

[52] U.S. Cl. ....... 242/191, 179/100.2 ZA, 242/199, 242/203

[51] Int. Cl. ...................... G11b 15/18, G11b 15/66

[58] Field of Search ........... 242/191, 190, 189, 186, 242/192, 195, 197, 198, 199, 200, 210, 182, 183, 75.51, 57, 203, 202; 179/100.2 ZA; 226/91, 92

[56] References Cited

UNITED STATES PATENTS 2,891,736 6/1959 Blaes .................................. 242/195

2,904,275 9/1959 Selsted et al. ................ 242/75.51 X 3,488,017 1/1970 Schatteman ........................ 242/191

3,511,451 5/1970 Emmert ............................ 242/57 X 3,643,895 2/1972 Atsumi ............................ 242/57 X 3,654,400 4/1972 Dickens et al. ................ 242/209 X

*Primary Examiner*—George F. Mautz

*Attorney, Agent, or Firm*—Eugene M. Whitacre

[57] ABSTRACT

An arrangement for providing initial holdback tension on a recording web which is payed out from a rotatable web supply reel, where the amount of recording web initially present on the supply reel is unknown. Rotational movement of the supply reel during web disposition for signal transducing, is sensed and utilized to provide appropriate initial counter-torque on the supply reel.

7 Claims, 3 Drawing Figures

INVENTOR.
Morris B. Finkelstein
BY James B. Hayes
ATTORNEY

PATENTED JUL 16 1974 3,823,896

SHEET 2 OF 3

INVENTOR.
Morris B. Finkelstein
BY James B. Hayes
ATTORNEY

PATENTED JUL 16 1974

3,823,896

SHEET 3 OF 3

INVENTOR.
Morris B. Finkelstein
BY James B. Hayes
ATTORNEY

RECORDING WEB TENSION CONTROL

This invention relates to apparatus for controlling the transport of an elongated recording web, such as magnetic tape, in a recorder-reproducer system. More particularly, an arrangement is described for automatically establishing an initial hold back force on a web storage device, from which a variable and unknown amount of web is payed out through the transport of the recorder-reproducer system.

Most recorder-reproducer transport arrangements include a pay out device or supply reel, take-up reel and a tape drive member such as a capstan. In addition guide means are provided to transport the web or tape past one or a number of signal transducers, while the tape is travelling between the reels. The supply and take-up reels may be mounted separately or disposed within an enclosure known as a cartridge.

To achieve proper operation of the tape moving system, it is necessary to have properly adjusted supply and take-up reel tensions. It will be understood the effective diameter of the supply reel is a variable parameter, which depends upon the actual diameter of the spool or hub portion of the reel and amount of tape disposed on the reel spool. In practice the effective supply reel diameter can vary appreciably. For example the effective diameter may be two to four times the actual diameter of the reel hub. Therefore, a fixed torque applied to the supply reel by its control device, such as a motor, will produce a variable amount of tension in the outer most layer of the tape wrap on the reel spool as the tape is payed off the supply reel. Thus, to achieve proper operation of the tape moving system, it is necessary to take into account the effective diameter of the supply reel i.e. the spool or hub plus the amount of tape wound thereon, to apply the proper torque or drive to the supply reel in order to achieve a desired initial tension of the tape.

Briefly, in accordance with the invention, there is provided a recorder-reproducer system of the type having means for transporting an elongated record web along a given path and rotatable web supply means adapted to have the web initially disposed thereon. A predetermined portion of the web is then withdrawn from the supply means and disposed in the path for cooperation with the transport means. Means including rotation sensing means are coupled to the web supply means, for providing a control signal indicative of the extent of rotation of the supply means during the withdrawing of the predetermined web portion. Drive means are coupled to the web supply means to oppose pay out of the web from said web supply means. And means are provided which are active upon the completion of the withdrawing of the predetermined portion of the web, for energizing the drive means in accordance with the control signal.

Figure 1:
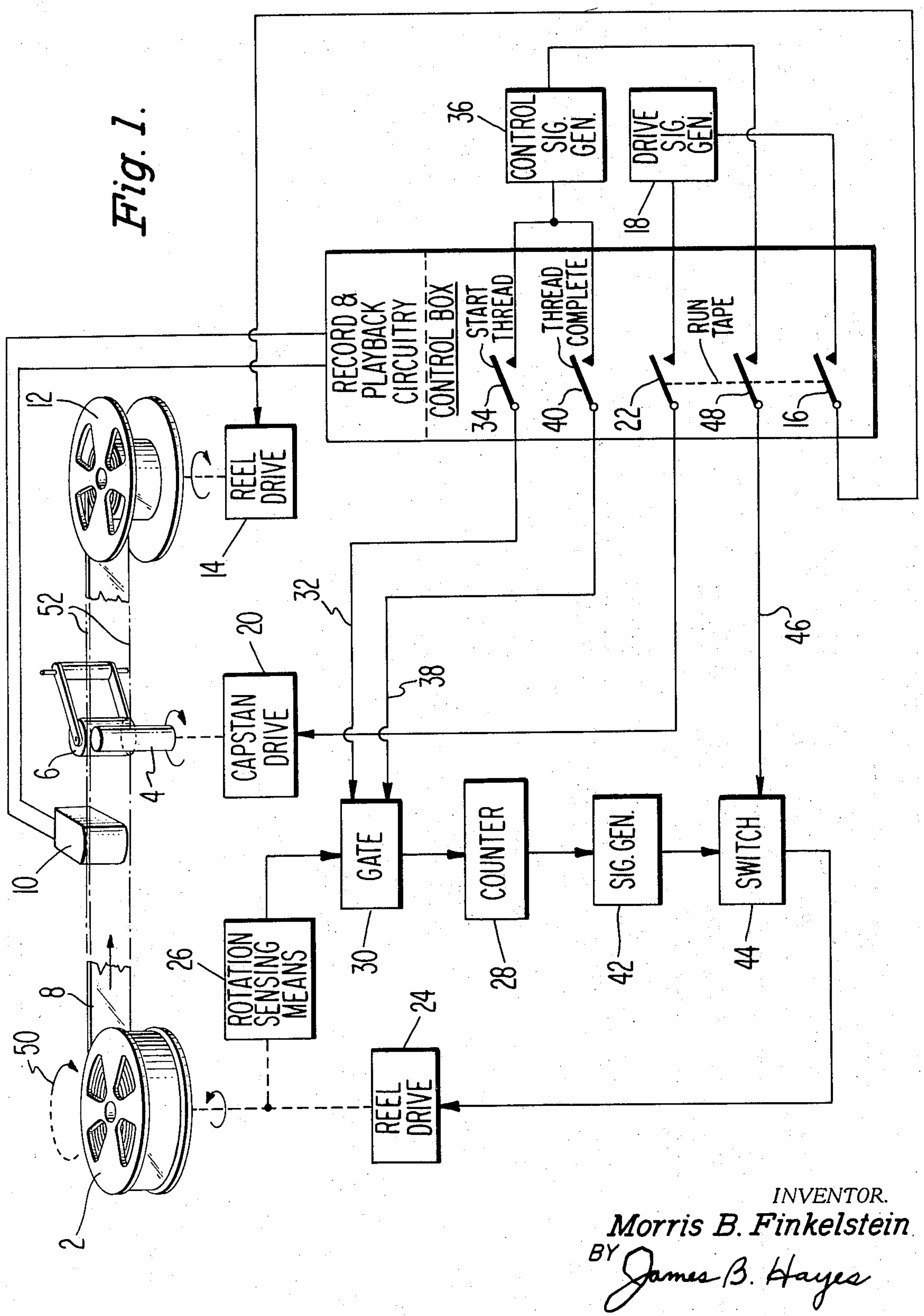
FIG. 1 is a partial schematic and partial diagrammatic view of a recorder-reproducer system embodying the invention.

FIG. 1 shows in simplified form a recorder-reproducer system including a supply reel 2, a capstan 4 and a pinch roller 6, signal transducer 10 and a takeup reel 12. In usual fashion a supply of an elongated record web or tape 8 is initially disposed on the supply reel 2.

The take-up reel 12 is controlled by a reel drive means 14 which is energized through a switch 16 from a drive signal generator 18. In similar manner the capstan 4 is controlled by a capstan drive 20 which is energized through switch 22 from the drive signal generator 18. A reel drive means 24 is coupled to the supply reel 2 in a manner which when said reel drive means is energized, it applies a rotational force or torque on the supply reel 2 which opposes pay out of the web or tape 8 from the reel 2. Also coupled to the reel 2 for rotation therewith is a rotation sensing means 26. The rotation sensing means 26, for example, may be a tachometer or other suitable means for providing an output indicative of the rotation of the reel 2. Further by way of example, the rotation sensing means may comprise a device wherein an output pulse is produced for each revolution or portion of a revolution of the supply reel 2. The output of the means 26 is applied to a counter 28 through suitable gating means 30. The gating means 30 is enabled to pass the output of means 26 to the counter 28, by a signal on lead 32 which is provided through switch 34 from a control signal generator 36. A signal on lead 38 which is provided through switch 40 from signal generator 36, disables the gating means 30 and therefore decouples the output of means 26 from the input to the counter 28. The output of counter 28 is applied to a signal generator 42. The signal generator 42 is of the type, providing a continuous output signal whose value is determined in accordance with the count value output of the counter means 28. The output of signal generator 42 is coupled as an input to switching means 44, with the output of the switching means 44 being applied to the reel drive 24. The application of the output of signal generator 42 to reel drive means 24, through the switch 44, is controlled by a signal on lead 46 which is provided from the control signal generator 36.

In operation of the system, a portion of the web or tape 8 which is initially disposed on the supply reel 2 is withdrawn. Withdrawing the portion of tape 8 from the supply reel 2 causes the supply reel 2 to be rotated in the direction indicated by the dashed arrow 50. The withdrawn portion of the tape 8 is disposed, as shown by dashed lines 52, in cooperative relation with the transducer 10, the capstan 4 and pinch roller 6 and for take-up by the reel 12. Withdrawing the tape 8 from the reel 2 for disposing it in the transport path of the recorder reproducer system, may be accomplished by manual means or suitable automatic means not shown in FIG. 1. During withdrawing of the tape from the supply reel 2 the rotation sensing means 26 provides an output indicative of revolutions of the supply reel 2. At or before the tape withdrawing operation is begun, switch 34 is disposed in the closed position. This applies a signal on lead 32 which, as previously indicated, enables the gating means 30 to provide an input to the counter 28. The counter 28 therefore is operative during the time the web 8 is withdrawn from the supply reel 2, to form in response to the output of means 26, an output count value corresponding to the number of rotations made by te supply reel 2 as the tape 8 is withdrawn therefrom. Upon completion of the withdrawing of the tape 8 and the threading or disposing of web 8 in the transport path, switch 40 is closed. The closure of switch 40 provides a signal on lead 38 to the gating means 30, which disables the gate 30 thereby removing the input to counter 28.

At this point, therefore, the output count value of the counter 28 is indicative of the effective diameter of the supply reel 2 and hence the amount of tape contained thereon. This will become clear from a consideration of the following. A tape reel 2 with a large amount of tape 8 initially disposed thereon, has an effective diameter which is greater than a corresponding reel with a smaller amount of tape 8 initially disposed thereon. Therefore in order to withdrawn a given amount of tape 8 from the supply reel 2 for disposition in the transport path, the supply reel 2 with a large effective diameter makes fewer revolutions than a supply reel having a relatively smaller effective diameter.

Since the counter 28 output value is indicative of the effective diameter of the supply reel 2, the signal generator 42 is arranged to provide an appropriate output value which when applied to reel drive means 24, produces a predetermined desired holdback force on the tape 8. It is to be noted that the number of turns of the supply reel 2 during withdraw of the tape 8 for disposition in the transport path varies inversely with the effective diameter of the tape reel. It is also to be noted however that, the amount of rotational force or torque to induce the desired predetermined value of holdback on the tape 8 varies directly with effective diameter of the supply reel 2. That is in order to produce the desired initial holdback force and therefore tension of the tape 8, a supply reel 2 with a large effect diameter makes fewer turns during withdraw of the tape 8 therefrom requires a higher torque applied thereto, than a smaller effective diameter reel making more turns. Thus to provide the desired holdback drive to the reel 2, the counter 28 is arranged to count down or in reverse sense in response to the input from means 26. That is, the output count value of the counter 28 is decreased as the number of rotations of the supply reel increases. Alternatively, the counter 28 may be arranged to count up or in ascending manner with signal generator 42 providing an output, whose value varies inversely with respect to the output count value of the counter 28. That is, a high output count value from the counter 28 produces a low value signal output from the generator 22, whereas a low count value produces a corresponding greater output value from the generator 42.

When it is desired to transduce information with the tape 8, switches 22, 48 and 16 which are arranged for contemporaneous operation are disposed in the closed position. Switches 22 and 16 provide suitable drive signals from generator 18 to the capstan 4 and takeup reel 12 respectively. The closure of switch 48 causes the switching means 44 to pass the output of generator 42 which is applied to reel drive means 24. The reel drive 24 in response to the output of signal generator 42 produces an appropriate torque value to the reel 2, for producing the desired initial holding back tension in the tape 8. Thus a system is provided for automatically establishing the proper initial tension of the tape 8, regardless of the amount of tape 8 on the supply reel 2.

Figure 2:
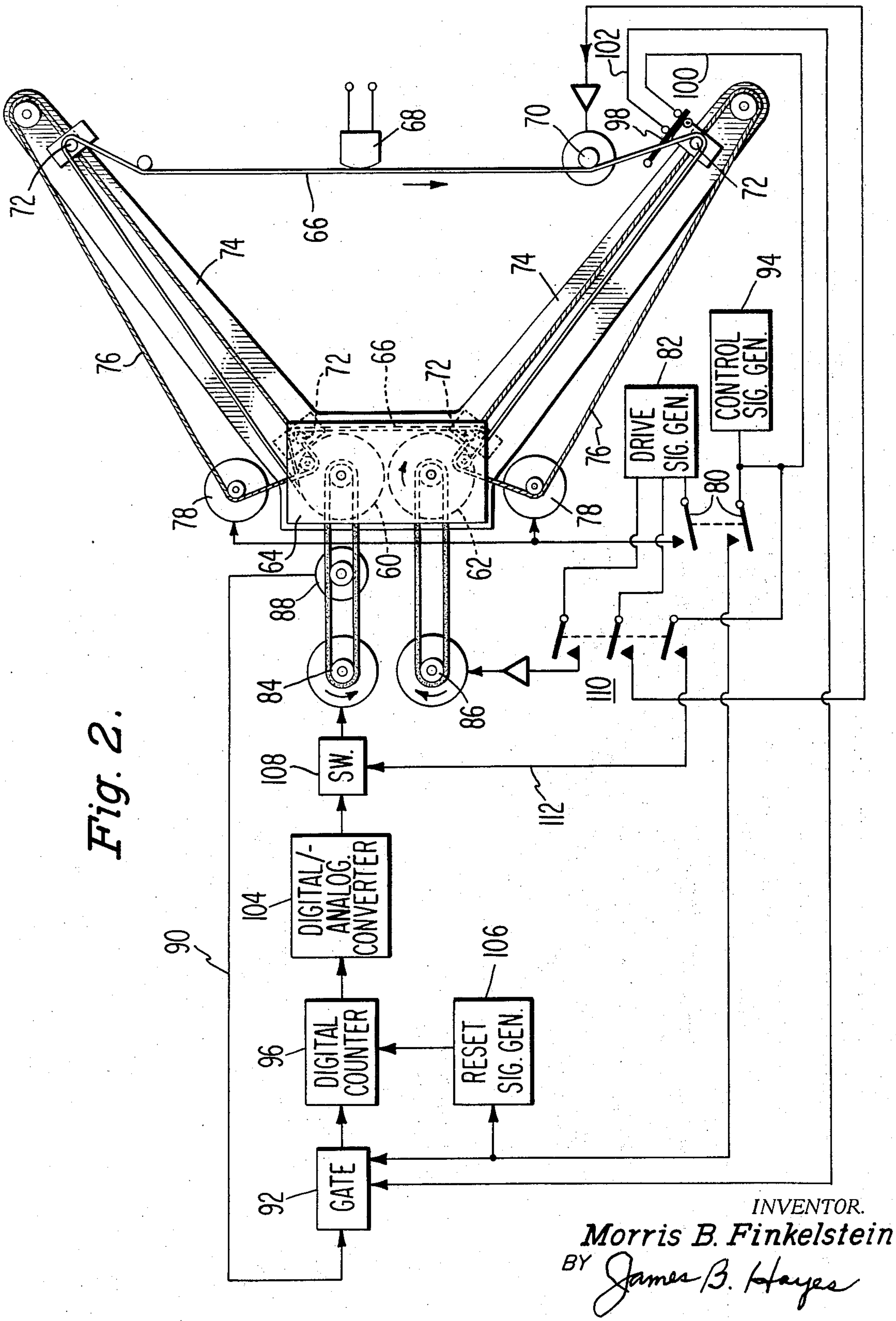
FIG. 2 is a partial schematic and partial diagrammatic view of a further embodiment of the invention.

FIG. 2 shows a further embodiment of the invention, including means for automatically withdrawing a tape from a supply reel and disposing the tape in the transport path of a recorder reproducer system. In FIG. 2, a supply reel 60 and takeup reel 62 are in known manner, rotatably disposed within a demountable enclosure 64 known as a tape cartridge. An amount of recording web or tape 66 is initially disposed on the supply reel 60, with the free end of the tape 66 being secured to the takeup reel 62. As previously indicated, the supply and takeup reels 60 and 62 could be provided separately independent of a cartridge. Automatic threading means are provided to withdraw the tape 66 from the cartridge, and dispose it in cooperative relation with the transducer 68 and a capstan drive 70. The threading means may include, as shown in FIG. 2, a pair of tape engaging pins or rods 72 which are slidably mounted on respective guide-ways 74. The tape engaging pins 72 are driven along the guide-ways 74 by suitable means such as belts 76 driven by a pair of motors 78, as shown in FIG. 2.

When switches 80 are disposed in the closed position, a drive signal from the generator 82 to thread control motor 78, causes the tape engaging pins 72 to be driven along the guide-ways 74 away from the cartridge 64. The movement of the pins 72 causes a portion of tape 66 to be withdrawn from the cartridge 64 and disposed in the tape path as shown in FIG. 2. Withdrawing of the tape 66 from the cartridge 64 causes the rotatably mounted supply reel 60 to turn an amount necessary to satisfy the demand of the tape threading mechanism. During this withdrawing or threading, rotation of the takeup reel 62 is preferably inhibited or prevented by suitable means such as a braking member not shown.

The supply reel 60 and takeup reel 62 are driven in known manner, by suitable motor driven belt arrangements 84 and 86 respectively. The motor driven belt arrangement 84 for the supply reel 60 is arranged, when energized to cause the reel 60 to rotate in a direction (counter-clockwise as shown) which opposes further pay out of tape 66 from the reel 60. During the threading operation the belt drive 84 for reel 60 is deenergized, with the reel 60 being rotated in a clockwise direction due to withdrawal of tape 66 therefrom, by the movement of pins 72. Coupled for rotation with the supply reel 60 is a tachometer means 88. The tachometer 88 may be one of several known types, which produce a pulse output indicative of the number of rotations of the shaft of the device. Rotation of the reel 60 during threading of the tape 66, causes a corresponding rotation and hence an output from the tachometer means 88. The pulsed output from means 88 on lead 90 is applied as an input to a gating means 92. Switch 80 in the closed position also provides a control signal from generator 94, which causes the output of means 88 on lead 90 to be applied as an input to a digital counter 96. The digital counter 96 may be one of many known types comprising, for example, a plurality of flip-flop stages intercoupled to count sequence of pulses applied to the first stage. The digital counter 96 thus forms a count in response to the output of means 88, which is indicative of the number of revolutions made by the supply reel 60.

At the completion of the threading operation, the tape engaging pins 72 are disposed, as shown in solid lines in FIG. 2, at the far end of the guide-ways 84 in spaced relation to the cartridge 64. In this extended condition, one of the tape threading pins 72 is arranged to cause a switch 98, which is normally in the open position, to close. The closure of switch 98 establishes continuity between leads 100 and 102. This continuity causes a signal from generator 94 on lead 100 to be applied to the gating means 92 via lead 102. The signal on lead 102 causes the gating means 92 to be disabled. That is, the output of means 88 is thereby removed as an input to the digital counter 96. Upon the removal of the input to digital counter 96 the counting operation is terminated, with the counter 96 retaining a value indicative of the number of revolutions of the supply reel 60 during the threading operation. The output of counter 96 in digital form is coupled to the input of a digital/analog converter 104. Again the converter 104 may be one of many known types which provide a continuous analog output in response to a digitally represented value input thereto. As previously explained, the resulting revolution count of the supply reel during threading is indicative of its effective diameter or radius. And the amount of holdback tension at the outer wrap of the tape on the supply reel, is determined by the effective radius (force arm) of the supply reel and the rotation urging force applied to the reel. Therefore, the resulting output value from the converter 104, corresponding with particular rotation indicating count supplied thereto, is made to produce, through the effective force arm radius of the particular supply reel present, a substantially constant initial holdback tension on the tape 66.

Further with regard to the operation of digital counter 96, there is provided a signal generator 106 for resetting the digital counter 96 at the beginning of a threading operation. Resetting of the digital counter 96 is accomplished by a control signal from generator 94, which is applied to the reset signal generator 106 upon the closure of switch 80 at the beginning of a threading operation. In practice of the invention, a supply reel with a relatively small effective diameter results in a relatively high number of revolutions to be counted. For example a count of 16 may be required to be handled. In such a case the counter 96 may for example be a binary counter having four stages, with respective outputs of $2^0$, $2^1$, $2^2$ and $2^3$ for representing count values between 0 and 16. Because of the inverse relationship between the effective diameter of the supply reel and the number of revolutions during threading as indicated previously, the counter is preferably arranged to count down from a high value towards zero in a given count cycle. It has been found advantageous in such an arrangement, to reset the counter 96 utilizing the generator 106 for commencing a count from a value which is intermediate the zero and 16th count value limits. For example in an arrangement for counting between the limits of zero and 16, the counter is initially set to a count value of 3, with subsequent counting proceeding from that point in cyclic manner through zero. Thus a sequence of seven or eight pulses input to the counter, will produce an actual count value of 12 or 11 in the 16 count cycle. For a series of 17 or 18 pulses inputted to the counter 96, the actual resultant count value will be 2 or 1 in the 16 count cycle. Hence there is some leeway provided in counting, to allow for a slightly larger or smaller effective diameter supply reel, even though the actual counter chain can only count 16 pulses. This arrangement for resetting the counter enables counting of a number of pulses which may exceed 16, without the necessities of adding further stages to the counter.

The correct amount of energization for the supply reel drive means 84 is thus provided as an input to switch 108. When it is desired to run the tape 66 through the transport means with the correct initial hold back tension, switches 110 are disposed in the closed position. This provides suitable drive energization from the generator 82 to takeup reel 62 and capstan 70. At the same time a signal from generator 94 on lead 12, causes the signal output from converter 104 to be applied as the energizing signal to the drive means 84 of the supply reel 60.

Figure 3:
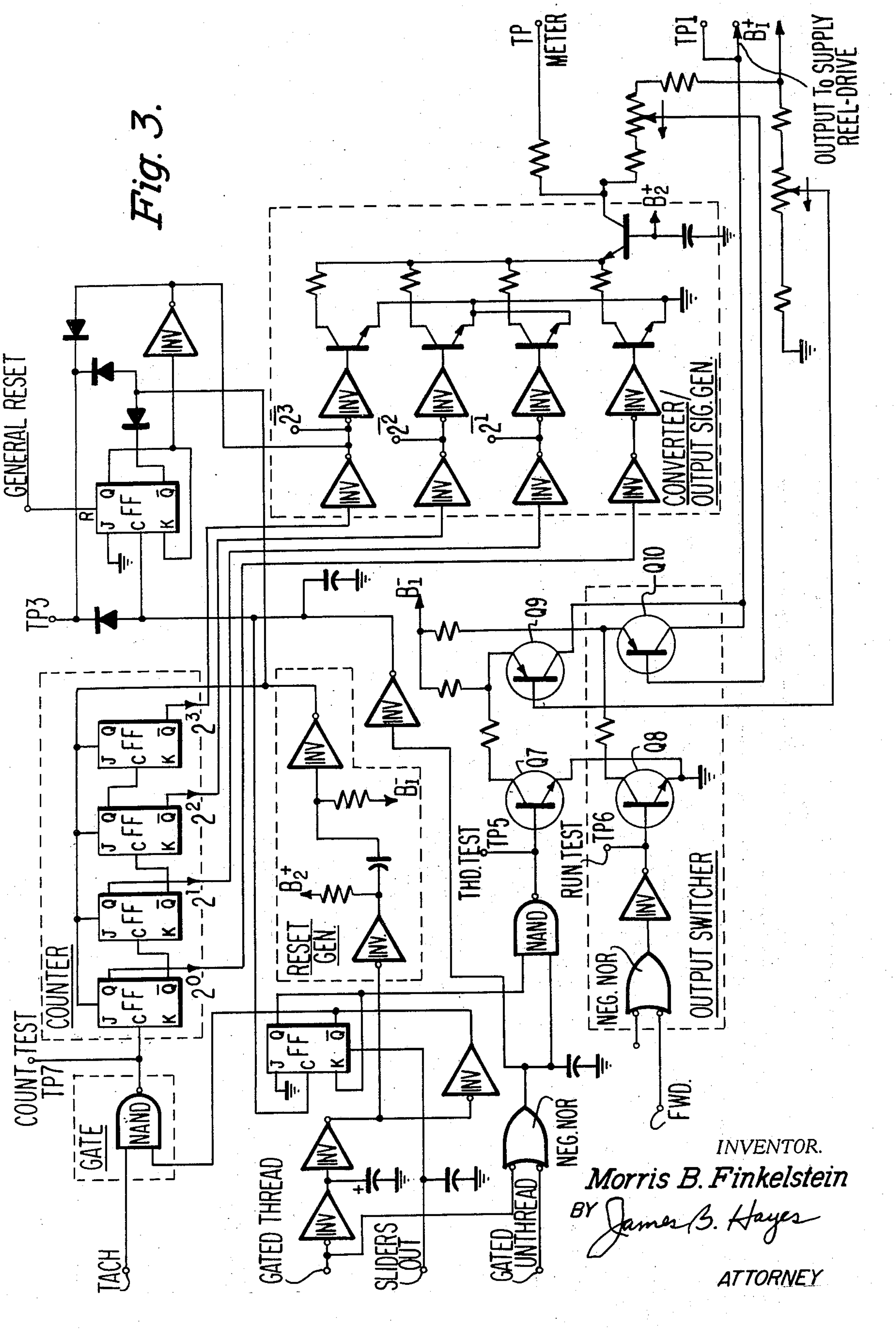
FIG. 3 is a schematic diagram showing circuit details for one embodiment of the invention.

In FIG. 3 there is shown, circuitry details of an embodiment for practicing the invention as described with respect to FIGS. 1 and 2. The basic functions described above are provided by the circuitry indicated in the corresponding dashed line boxes of FIG. 3. The balance of circuitry shown provides control during threading and unthreading, where the invention is utilized in a recorder-reproducer having means for automatically disposing and removing the recording web from the transport path of the system. As shown, the functions indicated are provided in simplified manner by flip-flops, inverters, logic gates such as NAND and negative NOR types, and suitable transistor stages, intercoupled as indicated. The circuit elements may be provided in discrete component form or using integrated circuits, which are well known and therefore need not be shown or described in detail herein.

What is claimed is:

1. The combination with a reproducer system of the type having means for transporting an elongated record web along a given path, rotatable web supply means adapted to have said web initially disposed thereon, and in which said web supply means is rotated in a given direction wherein a predetermined portion of said web is withdrawn from said web supply means and disposed in said path for cooperation with said transport means, comprising; means including sensing means responsive to the rotation of said web supply means for providing a control signal having a value indicative of the amount said supply means is rotated during the withdrawing of said predetermined web portion, drive means coupled to said web supply means to oppose when energized further payout of said web from said supply means as said web supply means is rotated in said given direction, and means active upon the completion of said withdrawing of said predetermined portion of said web for energizing said drive means in accordance with said control signal.

2. The invention according to claim 1, wherein: said third means includes tachometer means coupled to said web supply means providing an output in response to the revolution of said web supply means, counting means coupled to said tachometer means and responsive to said output for providing a further output indicative of the number of revolutions of said web supply means when said web portion is withdrawn, and means coupled to said counting means for providing said control signal with a value determined in response to said further output.

3. In a reproducer system of the type having, means for transporting an elongated record web along a given path, rotatable web supply means adapted to have said web initially disposed thereon, means for withdrawing a predetermined portion of said web from said supply means with said web supply means being rotated thereby, to dispose said web portion in said path for movement of said web thereover by said transport means and drive means coupled to said web supply means, said drive means being arranged to provide when energized a rotation urging force opposing payout of said web from said supply device, the combination comprising: rotation sensing means coupled to said web supply means for providing in response to each revolution of said supply means a first signal, means including counting means for providing a second signal whose value is determined in accordance with an input applied to said counting means, means coupled to said web withdrawing means for applying said first signal to said counting means during the interval said predetermined web portion is withdrawn from said supply means, means coupled to said transport means for providing a further signal in response to the initiation of movement of said web through said path by said transport means, and switching for energizing said drive means with said second signal in response to the occurrence of said further signal.

4. The invention according to claim 3, wherein; said means coupled to said web withdrawing means includes, signal generating means for providing third and fourth signals, said third and fourth signals being present respectively at the beginning and termination of the withdrawal of said predetermined web portion, gating means coupled to said rotation sensing means and responsive to said third signal to cause said first signal to be applied to said counting means, with said gating means responsive to said fourth signal for decoupling said first signal from said counting means.

5. The invention according to claim 4, wherein; said first signal comprises a train of pulses, said means for providing said second signal includes digital counting means for providing an output in digital form representing the summation value of the number of pulses of said pulse train applied to said counting means and converting means coupled to said counting means and responsive to the output thereof for providing a continuous value reference signal whose magnitude is determined by the summation value output of said counting means.

6. The invention according to claim 5, wherein, said counting means is arranged to provide a recurrent count cycle between fixed limits in which said output value decreases within a given cycle in response to an increasing number of input pulses applied to said counting means, and further including means coupled to said counting means and responsive to said third signal for initially disposing said counting means at a predetermined value in said count cycle which value lies between said limits.

7. The combination with a reproducer system of the type for transducing information with an elongated record web which is transported along a given path, said system including means adapted to receive a web storage cartridge having first and second reels rotatably mounted therein; said first reel having a supply of said web wound thereon with a free end of said web secured to said second reel, and drive means for said first and second reels, said drive means for said first reel being arranged when energized to apply a force to said first reel which opposes payout of said web from said reel, comprising; means for engaging said web in said cartridge, means for moving said engaging means to withdraw said web from said cartridge including a given portion of said web on said first reel with said first reel being rotated thereby, means including rotation sensing means coupled to said first reel for providing a first signal having a value indicative of the extent of rotation of said first reel during withdrawal of said web from said reel, means responsive to the movement of said engaging means for providing a further signal when said given portion of said web is withdrawn from said first reel, and means responsive to said further signal for energizing the drive means of said first reel in accordance with the value of said first signal.

* * * * *